(12) United States Patent
Nielsen et al.

(10) Patent No.: US 12,258,935 B2
(45) Date of Patent: Mar. 25, 2025

(54) PITCH CONTROLLED WIND TURBINE WITH BLADE CONNECTING MEMBERS AND SPLIT BLADES

(71) Applicant: Vestas Wind Systems A/S, Aarhus N (DK)

(72) Inventors: Thomas S. Bjertrup Nielsen, Randers Sv (DK); Robert Thomas Rudolf, Aarhus C (DK); Torben Juul Larsen, Roskilde (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/282,350

(22) PCT Filed: Mar. 18, 2022

(86) PCT No.: PCT/DK2022/050051
§ 371 (c)(1),
(2) Date: Sep. 15, 2023

(87) PCT Pub. No.: WO2022/194333
PCT Pub. Date: Sep. 22, 2022

(65) Prior Publication Data
US 2024/0159212 A1 May 16, 2024

(30) Foreign Application Priority Data
Mar. 18, 2021 (DK) .............. PA2021 00803

(51) Int. Cl.
*F03D 1/06* (2006.01)
(52) U.S. Cl.
CPC .......... *F03D 1/0664* (2023.08); *F03D 1/066* (2023.08); *F03D 1/0677* (2023.08);
(Continued)

(58) Field of Classification Search
CPC ...... F03D 1/0664; F03D 1/0677; F03D 1/066; F05B 2240/302; F05B 2240/912; F05B 2250/311
See application file for complete search history.

(56) References Cited

U.S. PATENT DOCUMENTS

2011/0309625 A1   12/2011  Dehlsen et al.
2012/0051912 A1*  3/2012   Shi ................. F03D 1/0633
                                                416/132 B
(Continued)

FOREIGN PATENT DOCUMENTS

CN    202417810 U      9/2012
CN    102536683 B  *  4/2014
(Continued)

OTHER PUBLICATIONS

Machine translation of CN102536683B; retrieved from Espacenet on Jan. 4, 2025.*
(Continued)

*Primary Examiner* — Sang K Kim
(74) *Attorney, Agent, or Firm* — Wood Herron & Evans LLP

(57) ABSTRACT

A pitch controlled wind turbine (1) comprising a tower (2), a nacelle (3) mounted on the tower (2), a hub (4) mounted rotatably on the nacelle (3), and at least three wind turbine blades (5) is disclosed. Each wind turbine blade (5) extends between a root end (6) connected to the hub (4), and a tip end (7). The wind turbine (1) further comprises at least three blade connecting members (8), each blade connecting member (8) extending between a connection point (9) on one wind turbine blade (5) and a connection point (9) on a neighbouring wind turbine blade (5). The wind turbine blades (5) each comprises an inboard blade part (5a) comprising the root end (6) and an outboard blade part (5b) comprising the tip end (7), the inboard blade part (5a) and the outboard blade part (5b) being connected to each other at a split position (10). The split position (10) is arranged between the root end (6) and the connection point (9).

14 Claims, 11 Drawing Sheets

(52) U.S. Cl.
CPC ... *F05B 2240/302* (2013.01); *F05B 2240/912* (2013.01); *F05B 2250/311* (2013.01)

(56) References Cited

U.S. PATENT DOCUMENTS

| | | | |
|---|---|---|---|
| 2012/0051914 A1* | 3/2012 | Dehlsen | F03D 7/0228 |
| | | | 416/147 |
| 2016/0377051 A1* | 12/2016 | Caruso | F03D 1/0675 |
| | | | 29/889.71 |
| 2019/0285047 A1* | 9/2019 | Zhou | F03D 1/0675 |

FOREIGN PATENT DOCUMENTS

| | | |
|---|---|---|
| CN | 102305174 B | 7/2014 |
| IN | 102562485 A | 7/2012 |
| WO | 2008111841 A2 | 9/2008 |
| WO | 2010046760 A2 | 4/2010 |
| WO | 2017049377 A1 | 3/2017 |

OTHER PUBLICATIONS

International Searching Authority, International Search Report and Written Opinion issued in PCT Application No. PCT/DK2022/050051, dated Jun. 29, 2022.

Danish Patent and Trademark Office, techincal examination issued in DK Patent No. PA 2021 00803, dated Aug. 27, 2021/.

\* cited by examiner

PITCH CONTROLLED WIND TURBINE WITH BLADE CONNECTING MEMBERS AND SPLIT BLADES

FIELD OF THE INVENTION

The present invention relates to a pitch controlled wind turbine comprising a tower, a nacelle mounted on the tower, a hub mounted rotatably on the nacelle, and at least three wind turbine blades connected to the hub via pitch mechanisms allowing full and/or partial pitch of the wind turbine blades.

BACKGROUND OF THE INVENTION

During operation of a wind turbine, the components of the wind turbine are subjected to various loads. For instance, the wind turbine blades of the wind turbine are subjected to loads originating from gravity acting on the wind turbine blades, loads originating from wind pressure on the wind turbine blades, loads originating from changes in wind direction or wind speed, turbulence, etc. Gravity acting on the wind turbine blades primarily results in edgewise loads on the wind turbine blades, and the wind acting on the wind turbine blades primarily results in flapwise loads on the wind turbine blades.

As the size of wind turbines increases, the loads on the wind turbine also increase. In order to handle such increased loads, the amount of material used for manufacturing the wind turbine may be increased. However, this increases the weight as well as the manufacturing costs of the wind turbine.

Furthermore, as the size of wind turbine blades increases, it becomes increasingly difficult to transport the wind turbine blades. One solution to this is to manufacture the wind turbine blades in at least three parts, which are transported separately and joined to each other to form the complete wind turbine blades at the site where the wind turbine is positioned. This is sometimes referred to as 'split wind turbine blades'. However, splitting a wind turbine blade in this manner may introduce weakness in the wind turbine blade, in the sense that the strength of the wind turbine blade may be adversely affected.

In prior art split wind turbine blades, the split position is normally arranged significantly closer to the tip end of the wind turbine blade than to the root end of the wind turbine blade, in order to arrange the split at a position where the expected loads are low, and the penalty on the ability of the wind turbine blade to handle loads can therefore be minimised. For instance, the split position may be arranged at a distance from the root end which is between 70% and 75% of the length of the wind turbine blade. However, positioning the split position this far from the root end requires that additional mass needs to be added to the inboard part of the wind turbine blade in order to carry the additional mass which is required at the split position in order to provide the required strength to the wind turbine blade. Furthermore, access to the split position, e.g. with the purpose of providing service or maintenance to the connection between the blade parts, is challenging, and would normally require the use of a large crane.

DESCRIPTION OF THE INVENTION

It is an object of embodiments of the invention to provide a pitch controlled wind turbine which allows large wind turbine blades to be transported without degrading the ability of the wind turbine to handle loads, and without increasing manufacturing costs.

It is a further object of embodiments of the invention to provide a pitch controlled wind turbine with split wind turbine blades, which allows easy service and maintenance of the connections between blade parts.

The invention provides a pitch controlled wind turbine comprising a tower, a nacelle mounted on the tower, a hub mounted rotatably on the nacelle, and at least three wind turbine blades, wherein each wind turbine blade extends between a root end connected to the hub, and a tip end, the wind turbine further comprising at least three blade connecting members, each blade connecting member extending between a connection point on one wind turbine blade and a connection point on a neighbouring wind turbine blade, where the connection point on a given wind turbine blade is arranged at a distance from the root end and at a distance from the tip end of the wind turbine blade, wherein the wind turbine blades each comprises an inboard blade part comprising the root end and an outboard blade part comprising the tip end, the inboard blade part and the outboard blade part being connected to each other at a split position, and wherein the split position is arranged between the root end and the connection point.

Thus, the invention provides a pitch controlled wind turbine, i.e. a wind turbine comprising wind turbine blades which are able to rotate about a substantially longitudinal pitch axis, in order to adjust an angle of attack between the wind turbine blades and the incoming wind, during operation of the wind turbine. The entire wind turbine blade may be able to rotate, in which case the wind turbine blade will normally be connected to a hub of the wind turbine via a pitch bearing arranged at a root end of the wind turbine blade. This is sometimes referred to as 'full pitch'. For full pitch, it is preferred that the full blade pitch together, so no pitching can take place at the split position for the blade part at one side of the split position relative to the blade part at the other side of the split position. This allows for a relatively simple connection between blade parts at the split position. As an alternative, only a part of the wind turbine blade may be able to rotate, in which case a pitch bearing will normally be provided between the part of the wind turbine blade which is able to rotate and a part of the wind turbine blade which is fixedly connected to the hub of the wind turbine. This is sometimes referred to as 'partial pitch'. This will be described in further detail below.

The wind turbine is preferably a horizontal axis wind turbine.

The wind turbine comprises a tower and a nacelle mounted on the tower. The wind turbine further comprises a hub mounted rotatably on the nacelle and at least three wind turbine blades. Each wind turbine blade extends between a root end which is connected to the hub, and a tip end. Thus, the wind turbine blades rotate along with the hub, relative to the nacelle, and the tip ends of the wind turbine blades point away from the hub. As described above, at least a part of each wind turbine blade is able to rotate relative to the hub, i.e. to perform pitching movements. The hub and the wind turbine blades form a rotor of the wind turbine.

The nacelle is normally mounted on the tower via a yaw system allowing the nacelle to rotate relative to the tower in order to appropriately orient the rotor in accordance with the direction of the wind.

The wind turbine further comprises at least three blade connecting members. Each blade connecting member extends between a connection point on one wind turbine blade and a connection point on a neighbouring wind turbine blade. Accordingly, each connecting member interconnects two neighbouring wind turbine blades. The connection point on a given wind turbine blade is arranged at a distance from the root end and at a distance from the tip end of the wind turbine blade. Thus, the connection point is neither arranged at the root end, nor at the tip end, but rather at a position between these two extremes, and with a non-zero distance to each end.

In the present context the term 'member' in connection member and pre-tension member should be interpreted broadly to cover any suitable kind of tension member, such as braided or laid ropes of metal wires (such as steel wires), polymer fibres (such as for example polyethylene, polypropylene, nylon, polyester, aramid, inorganic fibres (such as for example carbon fibres) or hybrid ropes of such materials, composite pultrusion, metal rods, etc.

The blade connecting members cause the wind turbine blades to mutually support each other, in the sense that loads on the wind turbine blades, in particular edgewise loads and flapwise loads, are 'shared' among the wind turbine blades, via the blade connecting members. Thereby the loads on the wind turbine blades during operation of the wind turbine can be handled without requiring higher material thickness, and thereby increased weight and higher manufacturing costs.

The wind turbine blades each comprises an inboard blade part comprising the root end and an outboard blade part comprising the tip end. The inboard blade part and the outboard blade part are connected to each other at a split position. Accordingly, the wind turbine blades are split wind turbine blades as described above, and the inboard blade part and the outboard blade part can be transported separately to the site of the wind turbine. This allows for a design of the wind turbine in which the length of the wind turbine blades exceeds a maximum allowable length for the purpose of transport.

The split position is arranged between the root end and the connection point. Accordingly, the blade connecting members are connected to the outboard blade part or to a split position connecting the outboard blade part, and the split position is arranged at a position along the wind turbine blade which is inboard with respect to the connection point or including the connection point.

Thus, the split position is arranged at a position where the load sharing provided by the blade connecting members is significant. Accordingly, the loads occurring in this part of the wind turbine blade are significantly lower than would be the case in a similar wind turbine blade without blade connecting members. Therefore, a reduced strength of the wind turbine blade, caused by a split of the wind turbine blade, can be introduced in this part of the wind turbine blade without compromising the ability of the wind turbine blade to handle expected loads. In other words, the blade connecting members compensate for the reduced strength introduced by the blade split.

Thus, due to the blade connecting members and the relative positions of the split position and the connection point, it is possible to design the wind turbine with wind turbine blades having a length which exceeds normal transporting requirements, without significantly increasing the manufacturing costs of the wind turbine blades, and without compromising the ability of the wind turbine blades to handle loads.

The inboard blade part and the outboard blade part may be connected to each other by means of a bolted connection. As an alternative, the inboard blade part and the outboard blade part may be connected to each other by means of a suitable bonding technique, for instance the blade parts may be glued to each other. As another alternative, the inboard blade part and the outboard blade part may be connected to each other via a bearing. This will be described in further detail below.

The split positions of the wind turbine blades may be arranged at a distance from the root end which is between 15% and 60%, such as between 20% and 50%, such as between 25% and 40%, of the length of the wind turbine blades from the root end to the tip end.

According to this embodiment, the split position is arranged well away from the root end as well as well away from the tip end. Furthermore, it is ensured that the inboard blade part as well as the outboard blade part has a significant length, but that none of the blade parts has a length which exceeds transport specifications. Furthermore, the split position is sufficiently close to the root end to allow easy access from the hub for maintenance or service purposes.

The split positions of the wind turbine blades may be arranged at a position where a thickness-to-chord ratio of the wind turbine blades is between 24% and 70%, such as between 24.5% and 55.0%, such as between 26% and 50%.

According to this embodiment, the split position is arranged at a position which is also well away from the root end as well as well away from the tip end, and the remarks set forth above are therefore equally applicable here.

The split positions of the wind turbine blades may be arranged at a position defining a maximum chord.

According to this embodiment, it is possible to insert an intermediate blade part between the inboard blade part and the outboard blade part, where the intermediate blade defines the maximum chord along its entire length. Thereby wind turbine blades of various lengths can be manufactured, using the same moulds for the inboard blade parts and the outboard blade parts, respectively. Intermediate blade parts of various lengths may be applied, thereby allowing a series of modularly designed wind turbines with various rotor diameters to be manufactured, at minimum manufacturing costs. This will be described in further detail below. Similarly, wind turbine blades with various root diameters may be manufactured, by applying different inboard blade parts with identical outboard blade parts.

The split positions of the wind turbine blades may be arranged at a position which is at or near a centre of gravity of the wind turbine blades. For instance, the split position may be arranged at a position which is not more than 5% of the length of the wind turbine blade away from the centre of gravity of the wind turbine blade.

When mounting a wind turbine blade on a wind turbine, it is advantageous to attach lifting equipment to the wind turbine blade at or near the centre of gravity of the wind turbine blade, in order to balance the wind turbine blade during lifting. By arranging the split position at or near the centre of gravity of the wind turbine blade, reinforcement of the wind turbine blade at this position is already provided for, and therefore additional reinforcement in order to attach the lifting equipment is not required.

The split positions of the wind turbine blades may be arranged at a distance from the tip end which is between 50 m and 100 m, such as between 60 m and 80 m, such as between 65 m and 75 m. This will lead to an outboard part of the wind turbine blade which may be handled by conventional means and particularly when the split position of the wind turbine blade is between 60 m and 80 m, such as between 65 m and 75 m, the outboard part may be transported by road.

It is often difficult and expensive, and may even be impossible, to transport goods with a length exceeding 100 m by land transport. Therefore, the length of the outboard blade part should preferably not exceed 100 m. On the other hand, it may be an advantage to provide an outboard blade part which is as long as possible without exceeding transporting limitations, because this would result in the inboard blade part being as short as possible, thereby positioning the split position as close to the root end as possible. Thereby access to the connection between the inboard blade part and the outboard blade part for service or maintenance purposes, from the hub, is made easy.

Alternatively or additionally, the split positions of the wind turbine blades may be arranged at a position which ensures that the weight of the outboard blade part and the weight of the inboard blade part are substantially equal to each other. Thereby weight requirements during transport, handling and lifting of the blade parts can more easily be met.

The connection points of the wind turbine blades may be arranged at a distance from the root end which is between 20% and 70%, such as between 25% and 60%, such as between 30% and 55% of the length of the wind turbine blades from the root end to the tip end. The connection point may be on a blade part of wind turbine blade or on a split position.

According to this embodiment, the blade connecting members are connected to the wind turbine blades at a position which is well away from the root end as well as well away from the tip end of the wind turbine blade.

The position of the connection points along the wind turbine blades may be selected in a manner which suitably balances various issues which need to be taken into consideration. For instance, positioning the connection point close to the tip end of the wind turbine blade results in very efficient support to the wind turbine blades by the blade connecting members. However, this comes at a price of a high drag caused by the blade connecting members during rotation of the rotor, and thereby decreased energy production. On the other hand, positioning the connection point close to the root end of the wind turbine blade results in a low drag caused by the blade connecting members, thereby minimising the adverse impact on the energy production of the wind turbine. However, the support to the wind turbine blades by the blade connecting members will not be very efficient. By positioning the connection points at a distance from the root end which is between 20% and 70% of the length of the wind turbine blade, these considerations are balanced in such a manner that efficient support is obtained without introducing an unacceptable drag. Furthermore, by positioning the connecting within this region it is ensured that the blade connecting members are attached to the wind turbine blades where a structural stiffness of the wind turbine blade is sufficiently high. For instance, the structural stiffness of the wind turbine blade decreases towards the tip end, and connecting the blade connecting members too near the tip end may therefore create a significant pre-deformation of the wind turbine blade, which may prevent the ability to pitch the blade. The connection point being arranged in a certain blade part also encompass the split position(s) where this blade part is connected to another blade part.

Each wind turbine blade may further comprise at least one intermediate blade part, wherein the inboard blade part and the intermediate blade part are connected to each other at a first split position and the intermediate blade part and the outboard blade part are connected to each other at a second split position, and at least the first split position may be arranged between the root end and the connection point.

According to this embodiment, the wind turbine blade is made from at least three parts, i.e. the inboard blade part, the outboard blade part and the intermediate blade part. The intermediate blade part is arranged between the inboard blade part and the outboard blade part. It is not ruled out that two or more intermediate blade parts are connected end to end between the inboard blade part and the outboard blade part, but in the following only one intermediate blade is described for clarity reasons.

Since, according to this embodiment, the wind turbine blade comprises three blade parts, it also defines two split positions where adjacent blade parts are connected to each other. More particularly, the inboard blade part and the intermediate blade part are connected to each other at a first split position, and the intermediate blade part and the outboard blade part are connected to each other at a second split position. Thus, the first split position is closer to the root end than the second split position, and the second split position is closer to the tip end than the first split position.

At least the first split position is arranged between the root end and the connection point, i.e. in the manner described above.

The second split position may be arranged between the connection point and the tip end. According to this embodiment, the connection point is formed on the intermediate blade part.

Even though the support provided by the blade connecting members is more pronounced in the part of the wind turbine blade which is arranged between the root end of the wind turbine blade and the connection point than in the part of the wind turbine blade arranged between the connection point and the tip end, the loads on the wind turbine blade in the latter part are still reduced due to the blade connecting members. Therefore, it is still possible to position the second split position in this part of the wind turbine blade, as long as the first split position is arranged between the root end and the connection point.

As an alternative, the first split position as well as the second split position may be arranged between the root end of the wind turbine blade and the connection point, i.e. in the part of the wind turbine blade where the support provided by the blade connecting members has the highest impact.

By allowing for at least one intermediate blade part to be inserted between the inboard blade part and the outboard blade part, a modular blade design can be provided, where wind turbine blades of various lengths can be manufactured with identical inboard and outboard blade parts, and with intermediate blade parts of various lengths and/or a various number of intermediate blade parts arranged between the inboard blade part and the outboard blade part. Thereby only one mould design is required for manufacturing the inboard blade part for a number of different blade sizes, and only one mould design for the outboard blade part. This significantly reduces the manufacturing costs, while allowing for wind turbines with a number of different rotor diameters in the product line.

As described above, the intermediate blade part may have a constant chord along its entire length, and the split positions may be arranged at a position defining maximum chord.

Each wind turbine blade may be provided with at least two connection points, and the split position may be arranged between the root end and a first connection point, and a second connection point may be arranged between the first connection point and the tip end.

According to this embodiment, the wind turbine blades support each other via at least two sets of blade connecting members connected to the wind turbine blades at two different positions along the length of the wind turbine blades, i.e. at two different rotor radius positions. Thereby the support provided for the wind turbine blades by means of the blade connecting members is increased as compared to an embodiment where two neighbouring wind turbine blades are only connected via one blade connecting member. Furthermore, the split position is arranged inboard with respect to both of the connection points. Accordingly, the split position is arranged in a part of the wind turbine blade which benefits fully from the support provided by the two sets of blade connecting members.

The pitch controlled wind turbine may further comprise at least three pre-tension members, each pre-tension member being connected to one of the blade connecting members and to a hub part, each pre-tension member thereby providing pre-tension in the blade connecting member to which it is connected, preferably by biasing a part of the blade connection member (such as a point of the blade connection member midway between the blade connection points) towards the hub.

According to this embodiment, the pre-tension members pull the blade connecting members towards the hub, and thereby the pre-tension members provide pre-tension to the blade connecting members.

The blade connecting members may have a stiffness which differs from a stiffness of the pre-tension members, or the stiffness of the blade connecting members and the pre-tension members may be identical.

In the present context the term 'hub part' should be interpreted to mean the hub, or a part or an element which is connected to the hub in the sense that it rotates along with the hub relative to the nacelle. Such a part or element may be connected to an outer surface of the hub, protrude from the hub, be positioned inside the hub, or be positioned in any other suitable way, as long as it rotates along with the hub.

The pre-tension members may, e.g., be connected to the blade connecting members at a position which is distanced from each of the connection points on the wind turbine blades, e.g. with substantially equal distance to the connection points, i.e. approximately halfway between the wind turbine blades along the blade connecting member.

Since, according to this embodiment, a pre-tension in the blade connecting members is provided by means of pre-tension members interconnecting the blade connecting members and a hub part it is possible to control pre-tension in the pre-tension members, as well as in the blade connecting members, from the hub, thereby providing easy access for service or adjustment of the pre-tension. Furthermore, it is possible to adjust how much the mean flapwise load is affected for a given pre-tension force. For instance, a short pre-tension member will have a lower impact on the mean flapwise bending moment than a long pre-tension member. Finally, the risk of slack members is reduced, since the pre-tension system can be softer than the blade connecting members.

The pre-tension members may be arranged to provide an adjustable pre-tension in the blade connecting members, or the provided pre-tension may be constant.

The pitch controlled wind turbine may further comprise a hub extender interconnecting the wind turbine blades and the hub.

In the present context the term 'hub extender' should be interpreted to mean a component which is connected at one end to the hub and at an opposite end to a root end of a wind turbine blade. Thereby a distance is introduced between the hub and the wind turbine blade. The wind turbine blade may, e.g., be connected to the hub extender via a pitch bearing, thereby allowing the wind turbine blade to perform pitching movements relative to the hub extender, and thereby relative to the hub. The hub extender may have an aerodynamic shape or be provided with aerodynamically enhancing elements, such as airfoils, vortex generators, gurney flaps, stall barriers, etc. As an alternative, the hub extender may have any other suitable shape, for instance a cylindrical shape.

Hub extenders allow the rotor diameter to be increased without changing the design of the wind turbine blades. Since an increased rotor diameter results in increased power production, it is thereby possibly to increase the nominal power of a given wind turbine model without replacing the moulds used for manufacturing the wind turbine blades.

The blade connecting members may be connected to the respective wind turbine blades via bearing structures mounted on or forming part of the wind turbine blades. The bearing structure may, e.g., be or include a roller bearing, a sliding bearing, a spherical bearing, or any other suitable kind of bearing.

The bearing structure ensures that the wind turbine blade is allowed to rotate relative to the blade connecting members, via the bearing structure. Thereby the wind turbine blades can perform pitching movements without affecting the blade connecting members, and thereby it is avoided that undesired loading, twist or tension is applied to the blade connecting members during pitching.

In the case that the bearing structure is or comprises a spherical bearing, the blade connecting members are able to rotate freely relative to the wind turbine blades, about the connection point. Thereby only tension forces are transferred between the blade connecting members and the wind turbine blades, at the connection points.

In the case that the bearing structure protrudes from the wind turbine blade or is arranged circumferentially with respect to the wind turbine blade, the bearing structure may be provided with a fairing or a similar aerodynamic structure in order to improve the aerodynamical properties of the wind turbine blade in the region of the bearing structure.

The root end of each wind turbine blade may be connected to the hub via a pitch bearing.

According to this embodiment, the entire wind turbine blade rotates when pitching movements are performed. This is sometimes referred to as 'full pitch'.

Alternatively or additionally, each wind turbine blade may comprise a pitch bearing arranged at the split position, thereby allowing the outboard blade part to perform pitching movements relative to the inboard blade part. This is sometimes referred to as 'partial pitch'.

A wind turbine blade which is able to perform partial pitch needs to be split into an inboard blade part and an outboard blade part, in order to allow one part of the wind turbine blade to perform pitching movements relative to another part of the wind turbine blade. It is therefore advantageous that the split position for this purpose is arranged along the wind turbine blade in accordance with the present invention.

As an alternative, each wind turbine blade may comprise a pitch bearing arranged at the connection point, thereby allowing the part of the wind turbine blade extending from the connection point to the tip end to perform pitching movements relative to the part of the wind turbine blade extending from the root end to the connection point.

According to this embodiment, the wind turbine blade is split at at least two positions, i.e. at a split position arranged between the root end of the wind turbine blade, as described above, and at the position where the blade connecting member is connected to the wind turbine blade.

The inboard blade part of each wind turbine blade may comprise a first inboard blade part and a second inboard blade part, where the first inboard blade part comprises a leading edge of the inboard blade part and the second inboard blade part comprises a trailing edge of the inboard blade part, and the first inboard blade part and the second inboard blade part may be connected to each other along a split interface extending along a direction defined by the length of the wind turbine blade.

According to this embodiment, apart from being split transversely to the longitudinal direction of the wind turbine blade, the wind turbine blade is also split along this longitudinal direction. However, this additional split is only present in the inboard blade part. The chord of the wind turbine blade is expected to be larger in a region near the root end than at a region near the tip end. For large wind turbine blades, the maximum chord may exceed maximum transporting dimensions. It may therefore be relevant to split the wind turbine blade transversely to the chord direction in order to allow the wind turbine blade to be transported. Such a split is sometimes referred to as 'chord extension'.

The pitch controlled wind turbine may be an upwind wind turbine, i.e. a wind turbine where the rotor is directed towards the incoming wind. As an alternative, the wind turbine may be a downwind wind turbine, i.e. a wind turbine where the rotor is directed away from the incoming wind.

BRIEF DESCRIPTION OF THE DRAWINGS

The invention will now be described in further detail with reference to the accompanying drawings in which.

DETAILED DESCRIPTION OF THE DRAWINGS

Figure 1:
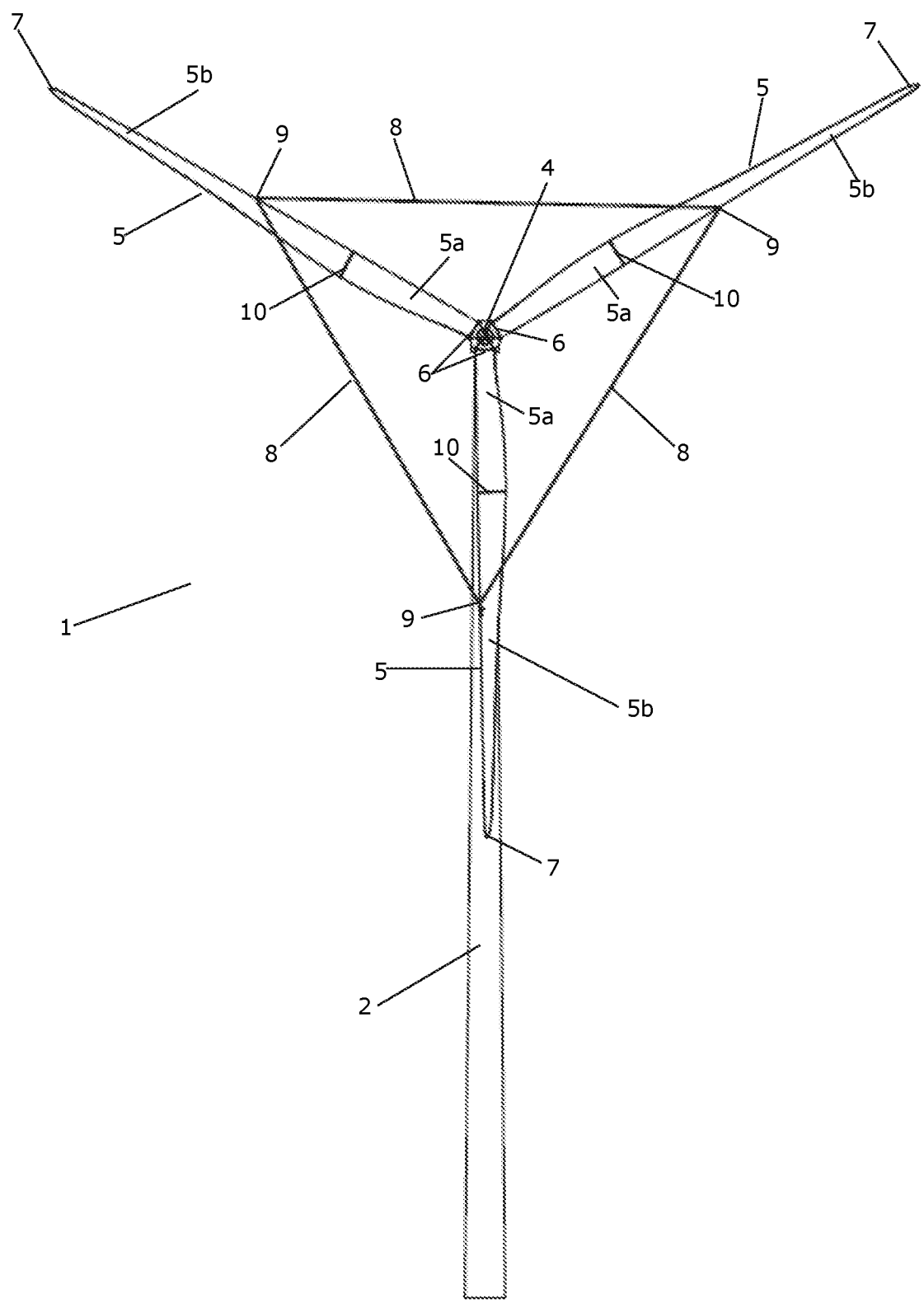
FIGS. 1-3 illustrate a pitch controlled wind turbine according to a first embodiment of the invention.
Figure 2:
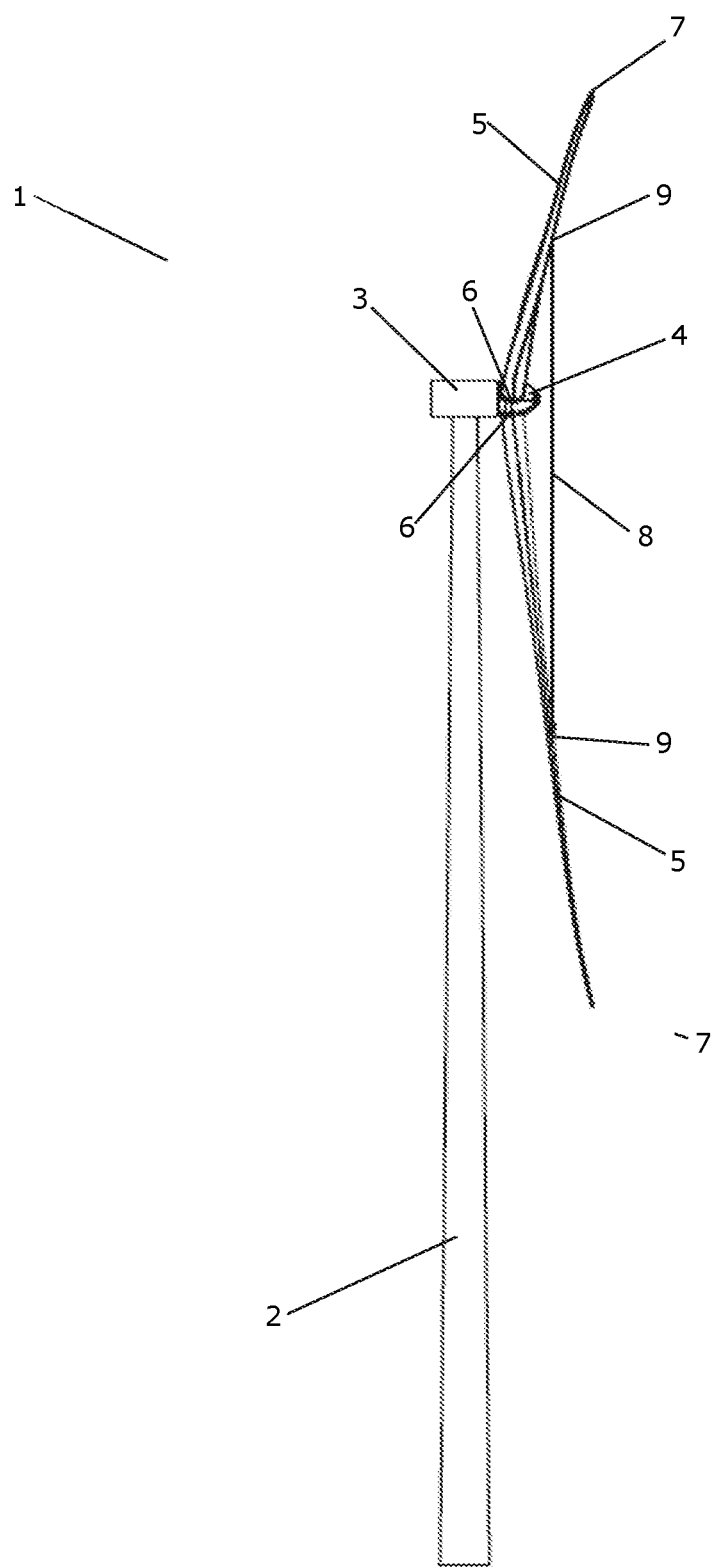
Figure 3:
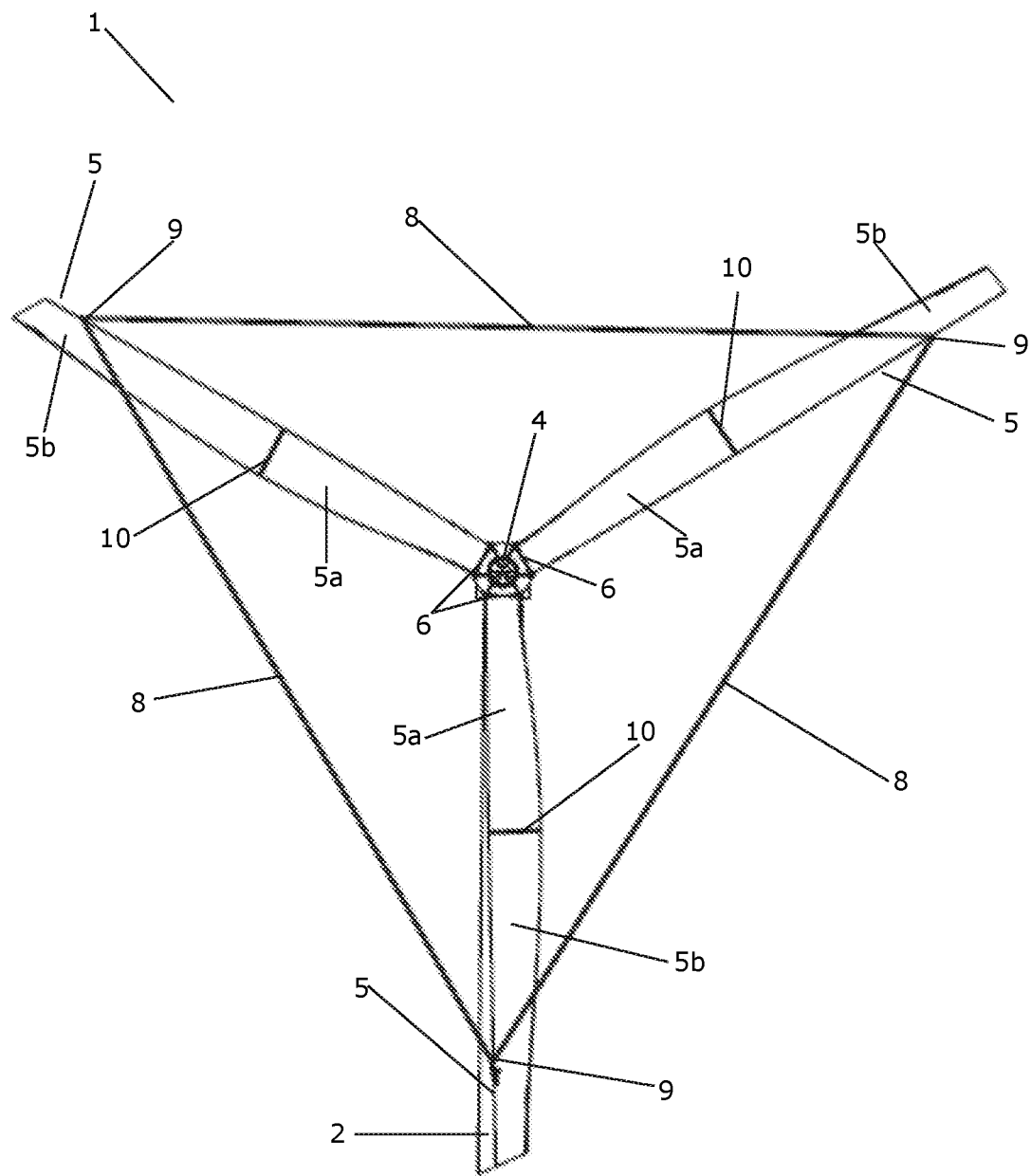

FIGS. 1-3 illustrate a pitch controlled wind turbine 1 according to a first embodiment of the invention. FIG. 1 is a front view of the wind turbine 1, FIG. 2 is a side view of the wind turbine 1, and FIG. 3 shows a detail of the wind turbine 1.

The wind turbine 1 comprises a tower 2, a nacelle 3 mounted on the tower 2 and a hub 4 mounted on the nacelle 2. Three wind turbine blades 5 are connected to the hub 4. Each wind turbine blade 5 extends between a root end 6 connected to the hub 4 and an oppositely arranged tip end 7.

The wind turbine 1 further comprises three blade connecting members 8. Each blade connecting member 8 interconnects two neighbouring wind turbine blades 5 by being connected to connection points 9 at the respective wind turbine blades 5. The wind turbine blades 5 are able to mutually support each other via the blade connecting members 8, in the sense that loads on the wind turbine blades 5, in particular edgewise loads and flapwise loads, are shared among the wind turbine blades 5, via the blade connecting members 8. In particular, the loads at the part of the wind turbine blade 5 which is arranged between the root end 6 and the connection point 9 are reduced due to the presence of the blade connecting members 8.

Each wind turbine blade 5 comprises an inboard blade part 5a comprising the root end 6, and an outboard blade part 5b comprising the tip end 7. The inboard blade part 5a and the outboard blade part 5b are connected to each other at a split position 10, i.e. the wind turbine blade 5 is a so-called 'split blade'. Thereby the inboard blade part 5a and the outboard blade part 5b may be manufactured separately and transported separately to a site of the wind turbine 1, and the inboard blade part 5a and the outboard blade part 5b may be assembled to form the wind turbine blade 5 at the site of the wind turbine 1. Accordingly, the length of the wind turbine blade 5 is allowed to exceed a maximum length which is dictated by transport requirements.

The split position 10 is arranged between the root end 6 and the connection point 9, i.e. the point where the blade connecting members 8 are connected to the wind turbine blade 5. Thus, the split position 10 is arranged in the part of the wind turbine blade 5 where a significant load reduction, due to the blade connecting members 8, is expected. It may therefore be expected that the wind turbine blade 5 will be able to handle the loads occurring during operation of the wind turbine 1, despite the weakness in the wind turbine blade 5 which is introduced by splitting the wind turbine blade 5.

Furthermore, arranging the split position 10 in this part of the wind turbine blade 5 allows the split position 10 to be easily accessible from the hub 4.

Figure 4:
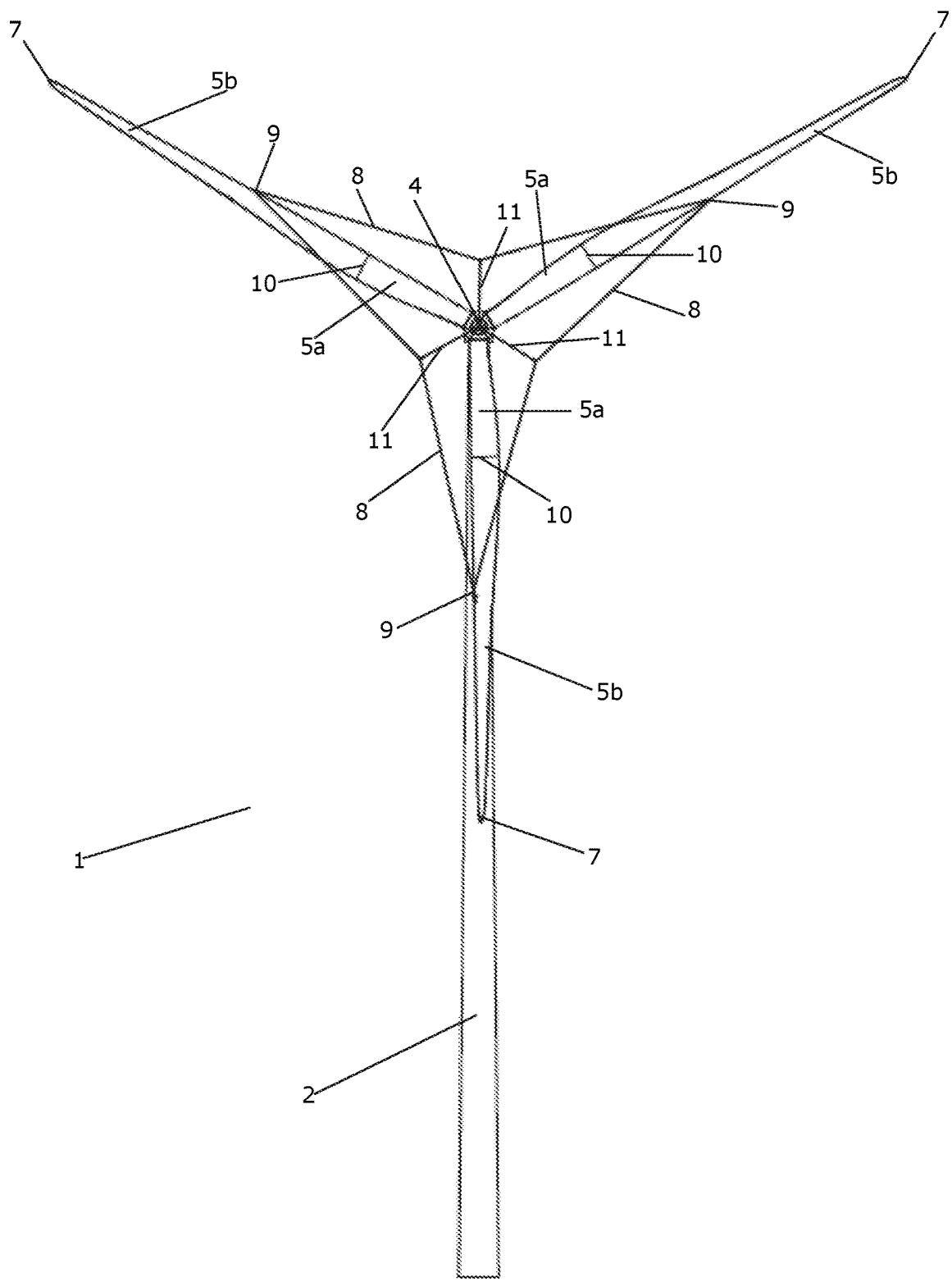
FIGS. 4 and 5 illustrate a pitch controlled wind turbine according to a second embodiment of the invention.
Figure 5:
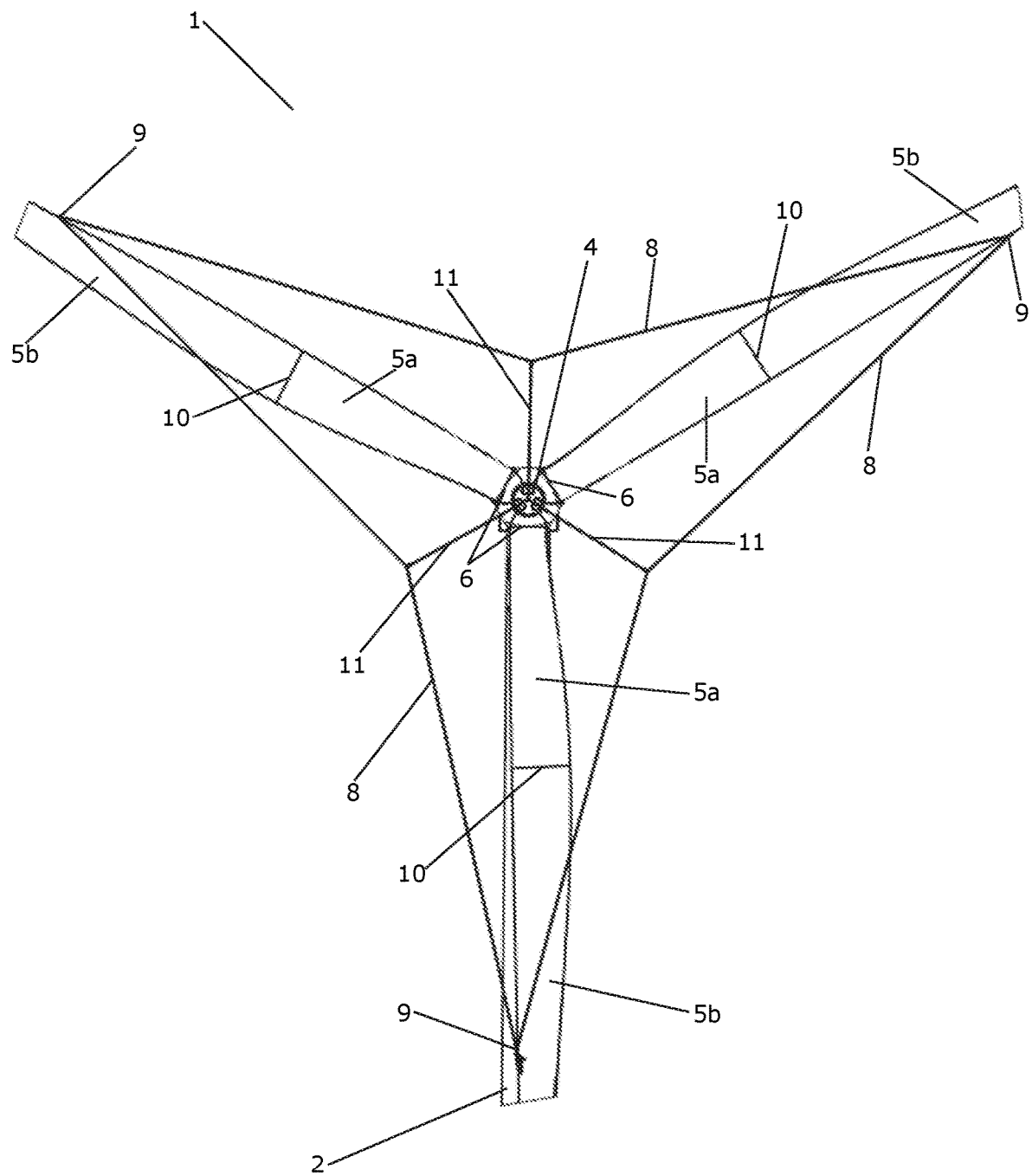

FIGS. 4 and 5 illustrate a pitch controlled wind turbine 1 according to a second embodiment of the invention. FIG. 4 is a front view of the wind turbine 1 and FIG. 5 shows a detail of the wind turbine 1.

The wind turbine 1 of FIGS. 4 and 5 is very similar to the wind turbine 1 of FIGS. 1-3, and it will therefore not be described in detail here.

The wind turbine 1 of FIGS. 4 and 5 further comprises three pre-tension members 11. Each pre-tension member 11 is connected to one of the blade connecting members 8, approximately half way between the connection points 9 at the wind turbine blades 5, and to the hub 4. Thus, the pre-tension members 11 pull the blade connecting members 8 towards the hub 4, thereby providing pre-tension in the blade connecting members 8.

The pre-tension in the blade connecting members 8 can thereby by adjusted by means of the pre-tension members 11, and thereby controlling to which extend the wind turbine blades 5 support each other via the blade connecting members 8.

Blade connecting members 8 may be comprise one or more sub parts, such as for example two sub parts or sections. This is particularly advantageous when the wind turbine comprises pre-tension member. Here, the connecting member 8 may for example and preferably comprising two sub sections, where each section is connecting a blade connection point to a connector element (not shown) to which connector element the pre-tension member is also connected. This allows for a safe and centred connection between the connecting members and the pre-tension member.

Figure 6:
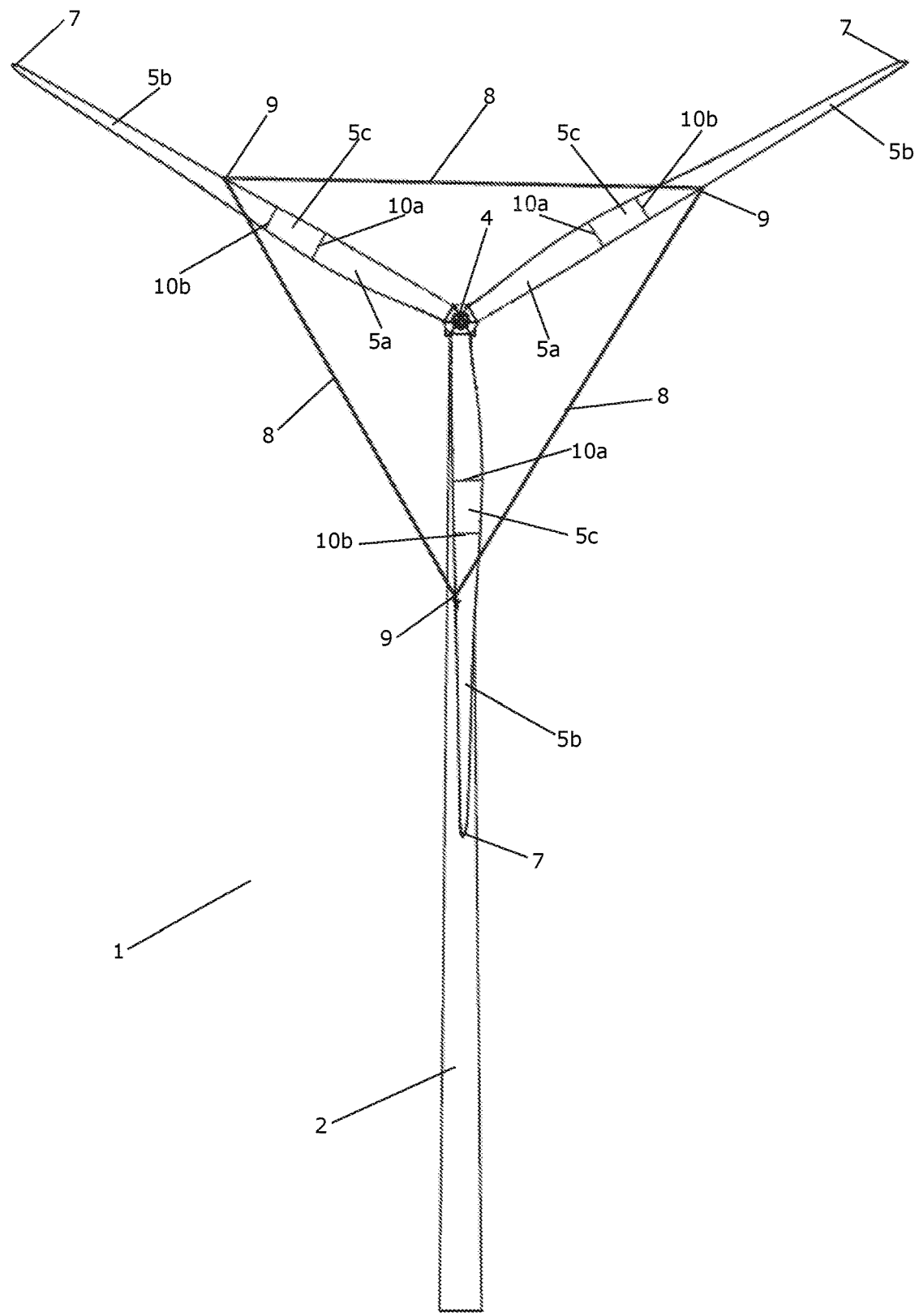
FIGS. 6 and 7 illustrate a pitch controlled wind turbine according to a third embodiment of the invention.
Figure 7:
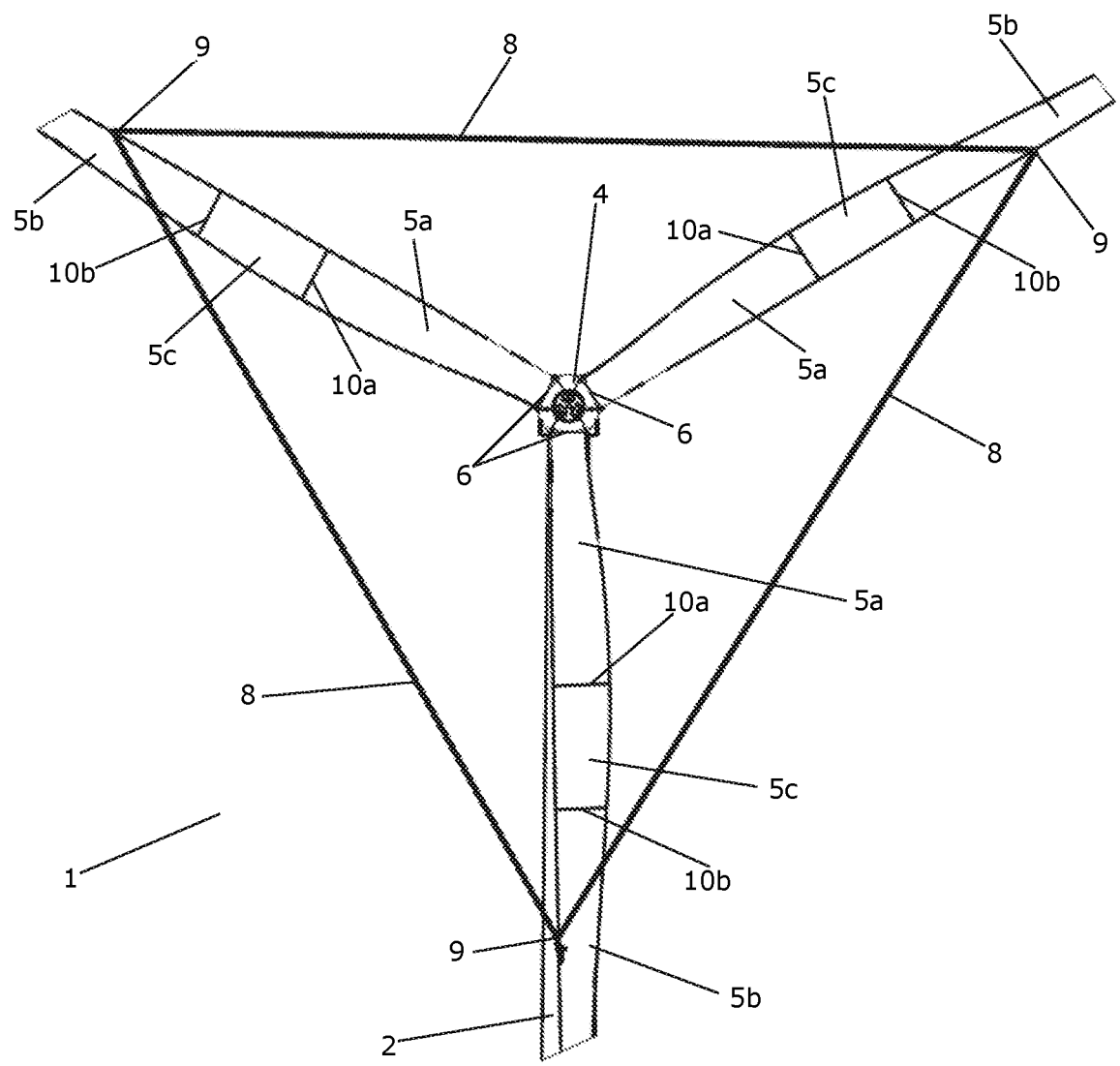

FIGS. 6 and 7 illustrate a pitch controlled wind turbine 1 according to a third embodiment of the invention. FIG. 6 is a front view of the wind turbine 1 and FIG. 7 shows a detail of the wind turbine 1.

The wind turbine 1 of FIGS. 6 and 7 is very similar to the wind turbine 1 of FIGS. 1-3, and it will therefore not be described in detail here.

In the wind turbine 1 of FIGS. 6 and 7 each wind turbine blade 5 further comprises an intermediate blade part 5c arranged between the inboard blade part 5a and the outboard blade part 5b. The inboard blade part 5a and the intermediate blade part 5c are connected to each other at a first split position 10a, and the intermediate blade part 5c and the outboard blade part 5b are connected to each other at a second split position 10b. Thus, each wind turbine blade 5 is split into three blade parts 5a, 5b, 5c, and defines two split positions 10a, 10b. Both split positions 10a, 10b are arranged between the root end 6 and the connection point 9, i.e. in the part of the wind turbine blade 5 where the load reduction caused by the support provided by the blade connecting members 8 is expected to be most significant. In another example (not shown) the blade connection point is on the intermediate blade part 5c. The blade connection point may be on the inboard blade part 5a, but this is not preferred as the load carried by the connecting members will be relatively low.

Splitting the wind turbine blades 5 into three parts allows for even longer wind turbine blades 5 without coming into conflict with transport constraints. Furthermore, this allows a modular design of the wind turbine 1, in the sense that the rotor diameter of the wind turbine 1 can be varied by appropriately selecting the length of the intermediate blade part 5c, without changing the design of the inboard blade part 5a and the outboard blade part 5b.

Figure 8:
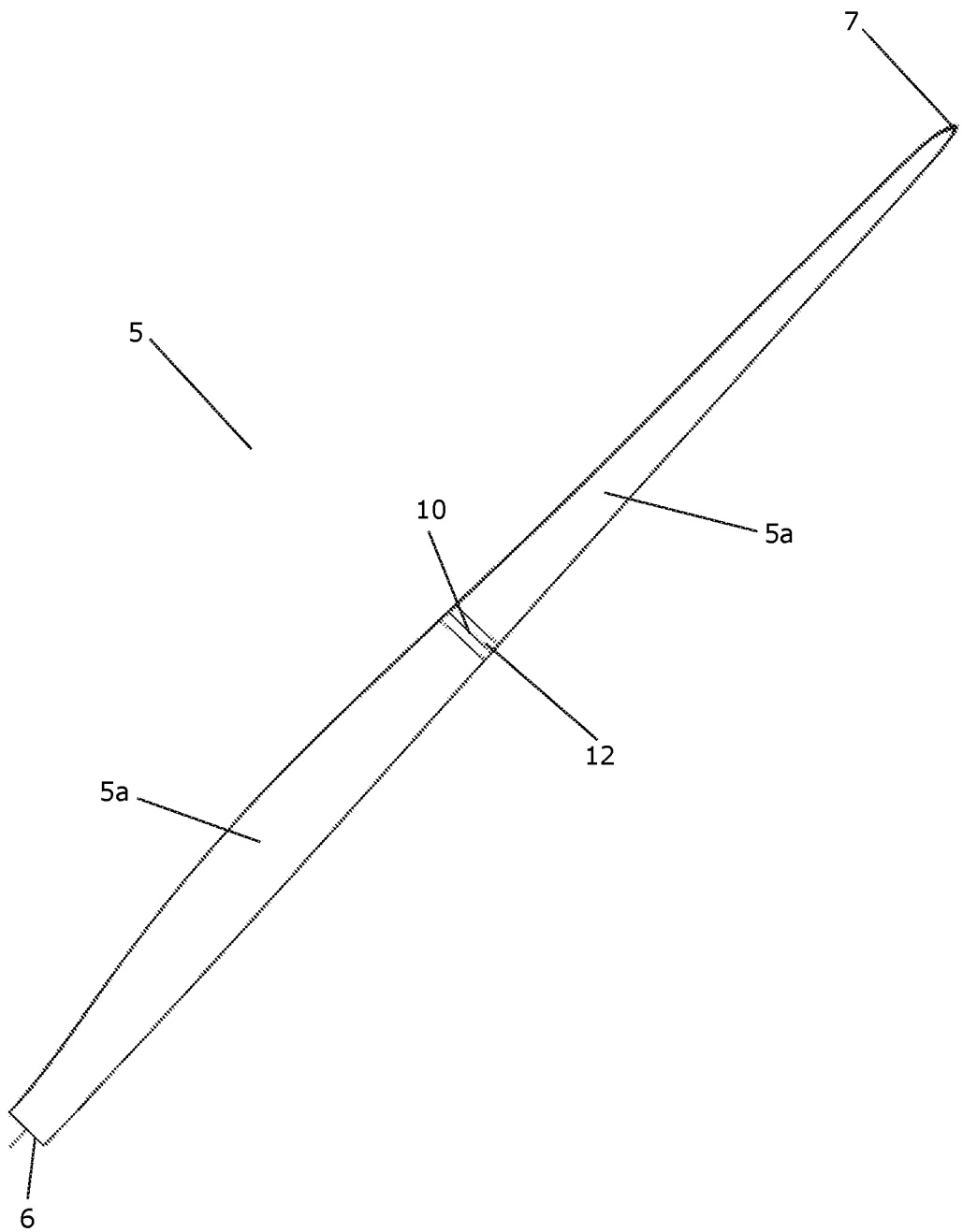
FIG. 8 is a perspective view of a wind turbine blade for a wind turbine according to an embodiment of the invention.

FIG. 8 is a perspective view of a wind turbine blade 5 for a wind turbine according to an embodiment of the invention. The wind turbine blade 5 comprises an inboard blade part 5a and an outboard blade part 5b connected to each other at a split position 10, as described above with reference to FIGS. 1-3.

The inboard blade part 5a and the outboard blade part 5b are connected to each other via a pitch bearing 12. Thereby the outboard blade part 5b is able to perform pitching movements relative to the inboard blade part 5a, i.e. to perform partial pitch.

Figure 9:
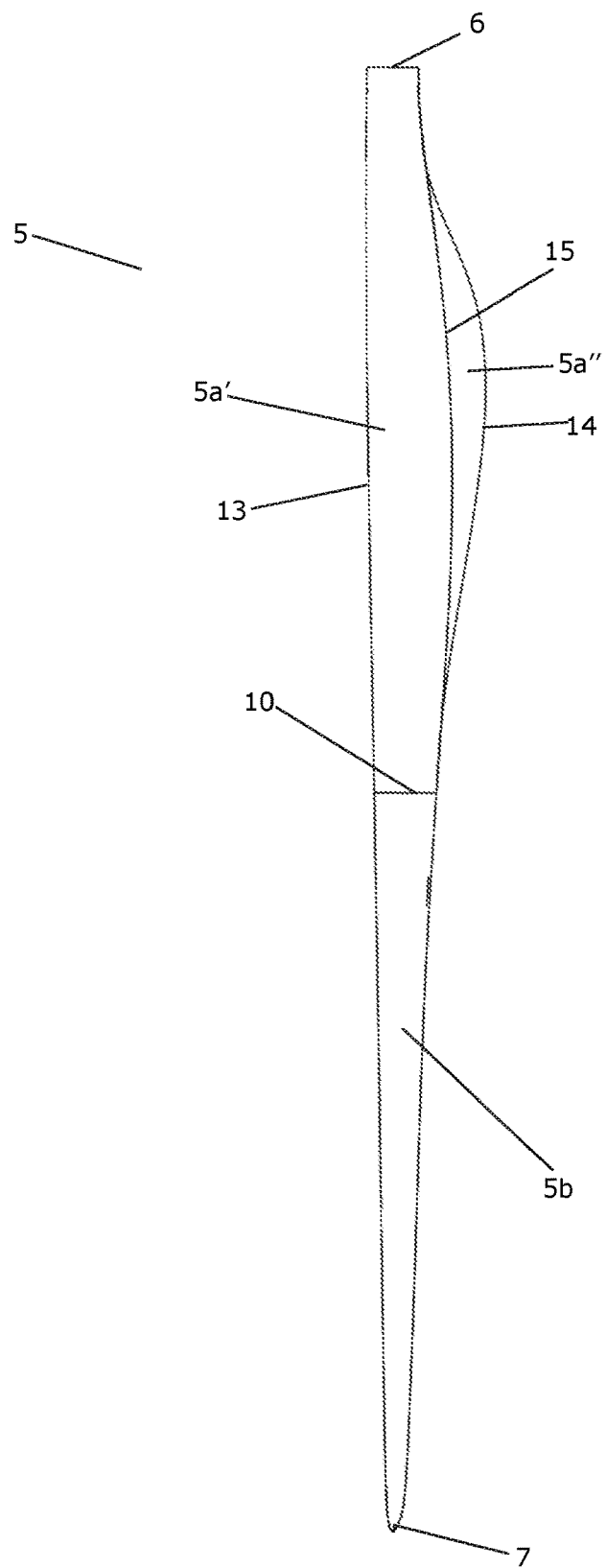
FIG. 9 is a side view of a wind turbine blade for a wind turbine according to an alternative embodiment of the invention.

FIG. 9 is a side view of a wind turbine blade 5 for a wind turbine according to an alternative embodiment of the invention. The wind turbine blade 5 comprises an inboard blade part 5a and an outboard blade part 5b connected to each other at a split position 10.

The inboard blade part 5a comprises a first inboard blade part 5a' and a second inboard blade part 5a". The first inboard blade part 5a' comprises a leading edge 13 of the inboard blade part 5a, and the second inboard blade part 5a" comprises a trailing edge 14 of the inboard blade part 5a.

The first inboard blade part 5a' and the second inboard blade part 5a" are connected to each other along a split interface 15 which extends substantially along a direction defined by the length of the wind turbine blade 5, and substantially perpendicularly to the transverse split interface between the inboard blade part 5a and the outboard blade part 5b at the split position 10. Thus, the wind turbine blade 5 illustrated in FIG. 9 is split into three parts, i.e. the first inboard blade part 5a', the second inboard blade part 5a" and the outboard blade part 5b. Here, the blade connection point is preferably on the first inboard blade part 5a' or the outboard part 5b including in the split position.

The chord of the wind turbine blade 5 is larger in the inboard blade part 5a than in the outboard blade part 5b. By splitting the inboard blade part 5a into the first inboard blade part 5a' and the second inboard blade part 5a", it can be obtained that none of the blade parts 5a', 5a", 5b has a width which exceeds maximum transporting constraints.

Figure 10:
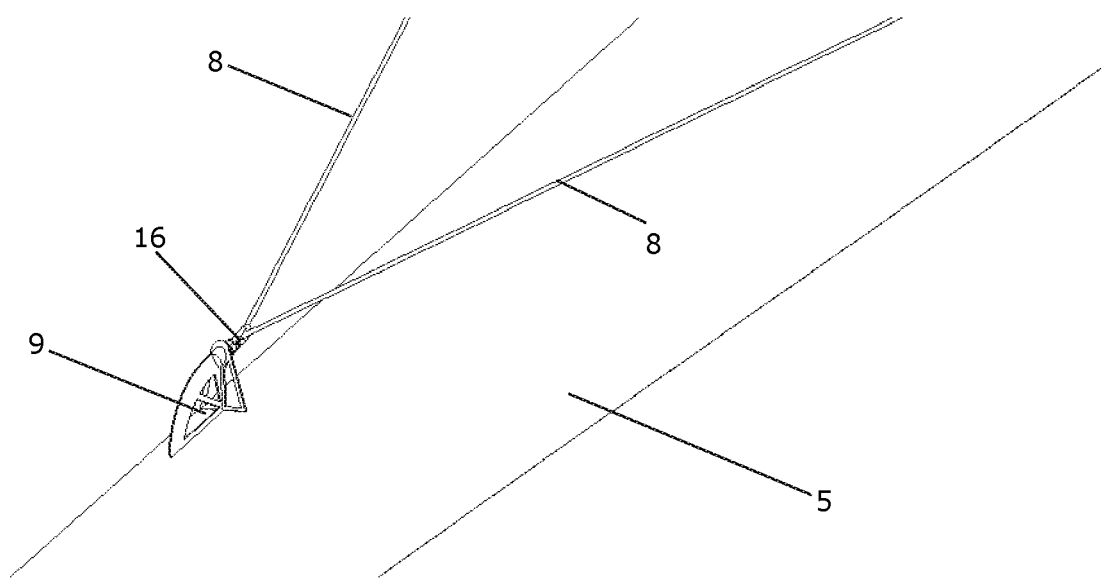
FIG. 10 illustrates connection of a blade connecting member to a wind turbine blade for a wind turbine according to an embodiment of the invention.

FIG. 10 is a perspective view of part of a wind turbine blade 5 for a wind turbine according to an embodiment of the invention. More particularly, FIG. 10 shows a part of the wind turbine blade 5 which comprises the connection point 9, i.e. the position where blade connecting members 8 are connected to the wind turbine blade 5.

The blade connecting members 8 are connected to the wind turbine blade 5 via a bearing structure 16. This allows the wind turbine blade 5 to perform pitching movements without affecting the blade connecting members 8. Thereby it is avoided that undesired loading, twist or tension is applied to the blade connecting members 8 during pitching of the wind turbine blade 5.

Figure 11:
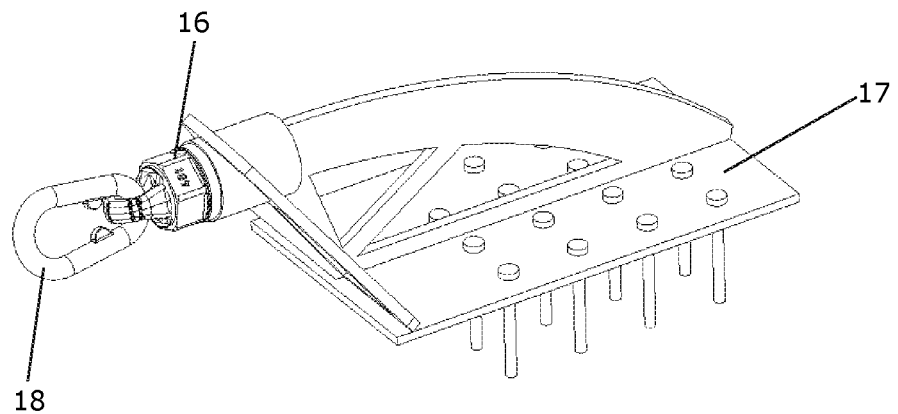
FIGS. 11 and 12 illustrate bearing structures for connecting a blade connecting member to a wind turbine blade for a wind turbine according to an embodiment of the invention.
Figure 12:
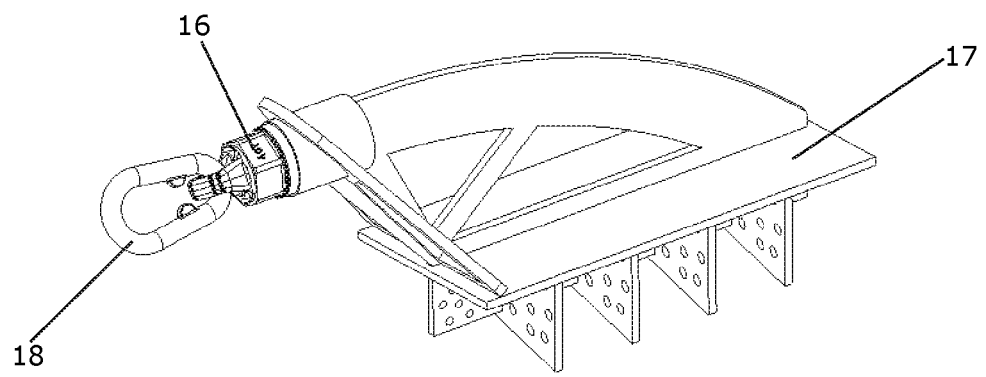

FIGS. 11 and 12 illustrate two different bearing structures 16 for connecting a blade connecting member to a wind turbine blade for a wind turbine according to an embodiment of the invention. For instance, the bearing structures 16 of FIGS. 11 and 12 may each be applied in the wind turbine blade illustrated in FIG. 10.

Plate-like structure 17 is attached to the wind turbine blade. FIGS. 11 and 12 illustrate two different structures for providing this attachment.

The blade connecting members are attached to an eyelet 18 which is mounted rotatably on the plate-like structure 17, thereby allowing the wind turbine blade, with the plate-like structure 17 attached thereto, to perform pitching movements relative to the eyelet 18, and thereby relative to the blade connecting members connected thereto.

The invention claimed is:

1. A pitch controlled wind turbine comprising:
a tower,
a nacelle mounted on the tower,
a hub mounted rotatably on the nacelle,
at least three wind turbine blades, wherein each wind turbine blade extends between a root end connected to the hub, and a tip end, the wind turbine further comprising at least three blade connecting members, each blade connecting member extending between a connection point on one wind turbine blade and a connection point on a neighbouring wind turbine blade, where the connection point on a given wind turbine blade is arranged at a distance from the root end and at a distance from the tip end of the wind turbine blade, and
at least three pre-tension members, wherein each pre-tension member is connected to one of the blade connecting members and to a hub part, each pre-tension member thereby providing pre-tension in the blade connecting member to which it is connected,
wherein the wind turbine blades each comprises an inboard blade part comprising the root end and an outboard blade part comprising the tip end, the inboard blade part and the outboard blade part being connected to each other at a split position, and
wherein the split position is arranged between the root end and the connection point, and
wherein the connection points of the wind turbine blades are arranged at a distance from the root end which is between 20% and 70% of the length of the wind turbine blades from the root end to the tip end.

2. The pitch controlled wind turbine according to claim 1, wherein the split positions of the wind turbine blades are arranged at a distance from the root end which is between 15% and 60% of the length of the wind turbine blades from the root end to the tip end.

3. The pitch controlled wind turbine according to claim 1, wherein the split positions of the wind turbine blades are arranged at a position where a thickness-to-chord ratio of the wind turbine blades is between 24% and 70%.

4. The pitch controlled wind turbine according to claim 1, wherein the split positions of the wind turbine blades are arranged at a position defining a maximum chord.

5. The pitch controlled wind turbine according to claim 1, wherein the split positions of the wind turbine blades are arranged at a position which is at or near a centre of gravity of the wind turbine blades.

6. The pitch controlled wind turbine according to claim 1, wherein the split positions of the wind turbine blades are arranged at a distance from the tip end which is between 50 m and 100 m.

7. The pitch controlled wind turbine according to claim 1, wherein the connection points of the wind turbine blades are arranged at a distance from the root end which is between 25% and 60% of the length of the wind turbine blades from the root end to the tip end.

8. The pitch controlled wind turbine according to claim 1, wherein each wind turbine blade further comprises at least one intermediate blade part, wherein the inboard blade part and the intermediate blade part are connected to each other at a first split position and the intermediate blade part and the outboard blade part are connected to each other at a second split position, and wherein at least the first split position is arranged between the root end and the connection point.

9. The pitch controlled wind turbine according to claim 8, wherein the second split position is arranged between the connection point and the tip end.

10. The pitch controlled wind turbine according to claim 1, wherein the blade connecting members are connected to the respective wind turbine blades via bearing structures mounted on or forming part of the wind turbine blades.

11. The pitch controlled wind turbine according to claim 1, wherein the root end of each wind turbine blade is connected to the hub via a pitch bearing.

12. The pitch controlled wind turbine according to claim 1, wherein each wind turbine blade comprises a pitch bearing arranged at the split position, thereby allowing the outboard blade part to perform pitching movements relative to the inboard blade part.

13. The pitch controlled wind turbine according to claim 1, wherein the inboard blade part of each wind turbine blade comprises:
   a first inboard blade part, and
   a second inboard blade part,
   wherein the first inboard blade part comprises a leading edge of the inboard blade part, and
   the second inboard blade part comprises a trailing edge of the inboard blade part, and
   wherein the first inboard blade part and the second inboard blade part are connected to each other along a split interface extending along a direction defined by the length of the wind turbine blade.

14. The pitch controlled wind turbine according to claim 1, wherein the wind turbine is an upwind wind turbine.

\* \* \* \* \*